United States Patent
Filgate et al.

(10) Patent No.: US 7,647,465 B2
(45) Date of Patent: Jan. 12, 2010

(54) STORAGE-SYSTEM-PORTION SUFFICIENCY DETERMINATION

(75) Inventors: Bruce Filgate, Boylston, MA (US);
Charles D. O'Toole, Northborough, MA (US); Peter Yakutis, Lexington, MA (US); Douglas Wallace Sharp, Acton, MA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 976 days.

(21) Appl. No.: 11/045,253

(22) Filed: Jan. 31, 2005

(65) Prior Publication Data

US 2006/0174086 A1 Aug. 3, 2006

(51) Int. Cl.
*G06F 13/00* (2006.01)
(52) U.S. Cl. .................. 711/170; 711/171; 711/172
(58) Field of Classification Search .............. 711/170
See application file for complete search history.

(56) References Cited

U.S. PATENT DOCUMENTS

2005/0066109 A1* 3/2005 Veazey et al. .............. 711/1

OTHER PUBLICATIONS http://www.winnetmag.com/WindowsScripting/Article/ArticleID/19856/WindowsScripting_19856.html.
Nance, B., "How to size your servers", http://www.windowsadvantage.com/features/12-24-01_size_servers.asp, (3 pgs).

* cited by examiner

*Primary Examiner*—Hetul Patel

(57) ABSTRACT

A method, for determining sufficiency of a given set of portions included within a storage system (SS) to accommodate one or more flows of data anticipated as flowing therethrough, may include: configuring the given set to include at least one of following portions, a given stable of one or more providers of data-storage (PDSs), and an SS-infrastructure; identifying components within members of the given set as queuing centers according to the one or more flows, respectively; estimating one or more capacity values, based upon the one or more flows, that will be demanded of the components, respectively; and determining whether the estimated one or more capacity values are acceptable in a context of corresponding capacity values attributed to the components, respectively.

31 Claims, 3 Drawing Sheets

STORAGE-SYSTEM-PORTION SUFFICIENCY DETERMINATION

BACKGROUND OF THE PRESENT INVENTION

A sizer is a software tool, for use in relation to a given apparatus, that operates upon (and optionally also gathers) information that is characteristic of a user's specifications for the given apparatus to estimate (as its name suggests) one or more values of parameters for the given apparatus sufficient to accommodate the user's requirements. For example, a server-sizing tool according to the Background Art provides sizing guidelines for the Microsoft® brand, Exchange model of messaging and collaboration server. Among the data generated by the Background Art server sizing tool are estimates of the total number of servers needed for a given user's requirements and a total amount of storage space demanded by the installation under consideration.

SUMMARY OF THE PRESENT INVENTION

At least one embodiment of the present invention provides a method for determining sufficiency of a given set of portions included within a storage system (SS) to accommodate one or more flows of data anticipated as flowing therethrough. Such a method may include: configuring the given set to include at least one of following portions, a given stable of one or more providers of data-storage (PDSs), and an SS-infrastructure; identifying components within members of the given set as queuing centers according to the one or more flows, respectively; estimating one or more capacity values, based upon the one or more flows, that will be demanded of the components, respectively; and determining whether the estimated one or more capacity values are acceptable in a context of corresponding capacity values attributed to the components, respectively.

Additional features and advantages of the present invention will be more fully apparent from the following detailed description of example embodiments, the accompanying drawings and the associated claims.

BRIEF DESCRIPTION OF THE DRAWINGS

The drawings are: intended to depict example embodiments of the present invention and should not be interpreted to limit the scope thereof. In particular, relative sizes of the components of a figure may be reduced or exaggerated for clarity. In other words, the figures are not drawn to scale.

DETAILED DESCRIPTION OF EXAMPLE EMBODIMENTS

In developing the present invention, the following problems with the Background Art were recognized and a path to a solution identified. While it can estimate the total number of servers needed by a software application to meet a given user's requirements and a total amount of storage space estimated as being required in view of the user's requirements, the Background Art server sizing tool does not generate information about which combination of particular providers of data-storage, e.g., particular instances of RAIDs, should be selected to achieve the total amount of storage estimated as being needed, nor can it determine the sufficiency of a given arrangement of data-storage providers to accommodate the given user's estimated data-storage needs. Furthermore, there is no software tool in the Background Art that can generate information about which combination(s) of particular switches, etc., to include in an SS-infrastructure (that connects the data-storage providers to the software application), nor is there a software tool in the Background Art that can determine the sufficiency of a given SS-infrastructure arrangement to accommodate the given user's estimated needs. At least one embodiment of the present invention provides such information.

Figure 1:
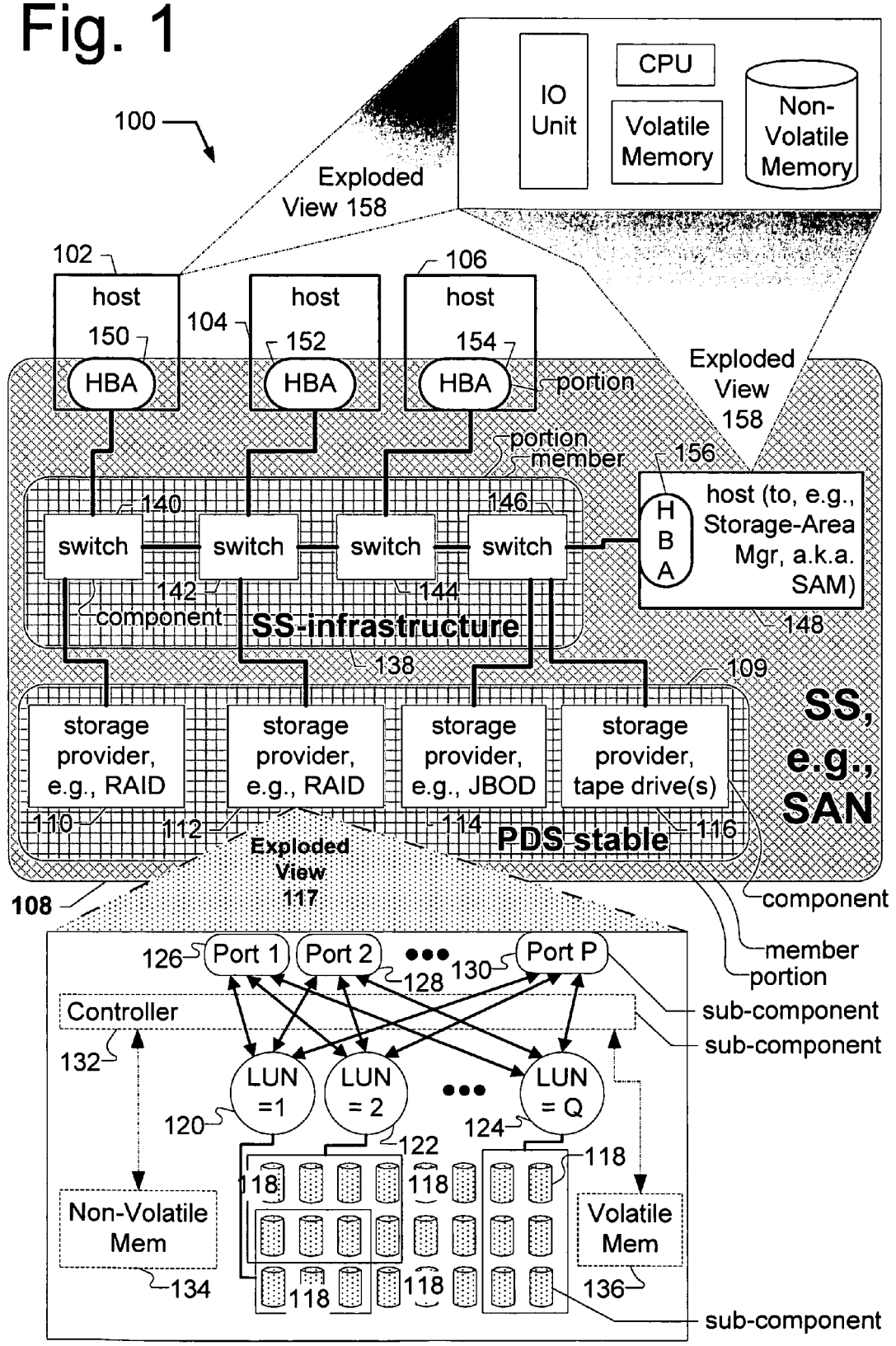
FIG. 1 depicts a block diagram of a system that includes a storage system, e.g., a storage area network (SAN), where at least one embodiment of the present invention can be used to select components included within portions of SAN 108 and/or to determine sufficiency of given arrangements of portions of SAN 108.

FIG. 1 depicts a block diagram of a system 100 that includes a storage system 108, e.g., a storage area network (again, SAN), where at least one embodiment of the present invention can be used to select components included within portions of SAN 108 and/or to determine sufficiency of given arrangements of portions of SAN 108.

In addition to SAN 108, system 100 further includes hosts 102, 104 and 106. Application software such as the Microsoft® brand Exchange model of messaging and collaboration server, the Microsoft®) brand Access model of database server, the SAP®) brand of various models of server software, the Oracle® brand of various models of database server, etc., can be loaded on hosts 102-106.

Portions of SAN 108 include: a stable 109 that itself includes one or more providers of data-storage (PDSs) 110, 112, 114 and 116 that represents storage; and an SS-infrastructure 138, parts thereof including, e.g., one or more switches 140, 142, 144 and 146. Relative to PDSs 110-116, hosts 102-106 can be described as consumers of data-storage (CDSs).

SS-infrastructure 138 includes the physical hardware used to interconnect PDSs 110-116 and hosts 102-106, respectively. More specifically, SS-infrastructure 138 can include: switches, e.g., 140-146, gateways, hubs, bridges, routers, etc., all of which can be described as controlling the transmission paths; the media which forms the transmission paths, e.g., telephone lines, cable television lines, satellites; antennas, etc.; software used to send, receive, and manage the signals that are transmitted; etc. SS-infrastructure 138 can be arranged, for example, according to: a Fibre Channel (FC) architecture (where such an infrastructure is sometimes referred to as the SAN-fabric); an IP (Internet Protocol) architecture; an FC/IP (FC over IP) architecture; an iSCSI (SCSI protocol over TCP/IP network, where SCSI is an acronym for Small Computer System Interface, and TCP is an acronym for Transmission Control Protocol) architecture; etc.; or some combination thereof.

Hosts 102-106 are depicted as including optional host-bus adapters (HBAs) 150, 152 and 154, respectively, which could be used if SS-infrastructure 138 is an FC-based architecture. Alternatively, units 150-156 could be Ethernet network interface cards or TOE (TCP Offload Engine) cards if SS-infrastructure 138 is an iSCSI-based architecture, etc.

Though hosts 102-106 typically are not considered to be portions of SAN 108, HBAs 150-154 typically are considered to be portions of SAN 108. In addition to HBA 150, typical components of host 102 are indicated via exploded view 158, and, e.g., can include: at least one CPU; at least one input device; at least one output device; volatile memory such as RAM; and non-volatile memory such as ROM, flash memory, disc drives, tape drives, etc.

SAN 108 also can include a host 148 that, for example, is a host to SAN-manager application software. Typical components of host 148 can include HBA 156 and such other components as are indicated via exploded view 158. Host 148 can also be described as a CDSs.

Stable 109 will typically include a variety of PDSs, at least one of which typically will be disk-drive-based, e.g., a RAID (redundant array of independent disks), a JBOD (Just a bunch of disks/drives), etc. For the sake of discussion, PDSs 110 and 112 have been depicted in FIG. 1 as being RAIDs, while PDS 114 has been depicted in FIG. 1 as being a JBOD. Stable 109 can also include a magnetic tape-based PDS, and so PDS 116 has been depicted in FIG. 1 as being magnetic tape-based for the sake of discussion.

Typical components of a RAID, e.g., PDS 112, can include the following (as indicated by exploded view 117): disk drives 118; logical unit (LU) 120 having LU number (LUN) 1; LU 122 having LUN 2; . . . ; LU 124 having LUN Q; ports 1 (item 126), 2 (item 128), . . . , P (item 130); a controller 132; non-volatile memory 134; and volatile memory 136. As exploded view 117 is primarily a logical diagram, controller 132 and memories 134 & 136 have been drawn with phantom lines. More particularly, communication paths between ports 126-130 and LUs 120-124 have been drawn as passing though controller 128 to convey that the access which such paths respectively represent is controlled by controller 132.

It is to be understood that the numbers of and types of units depicted in FIG. 1 represent one of many possible varieties of system 100, and of SAN 108 included therein. Other numbers and/or types of units can be included system 100, and in SAN 108 included therein. For example, in addition to or instead of switches, SS-infrastructure 138 can include other interconnect devices such as gateways, hubs, bridges, routers, etc.

Selection of the components included within portions of SAN 108 and the determination of the sufficiency of given component-arrangements of portions of SAN 108 will now be discussed.

Figure 2A:
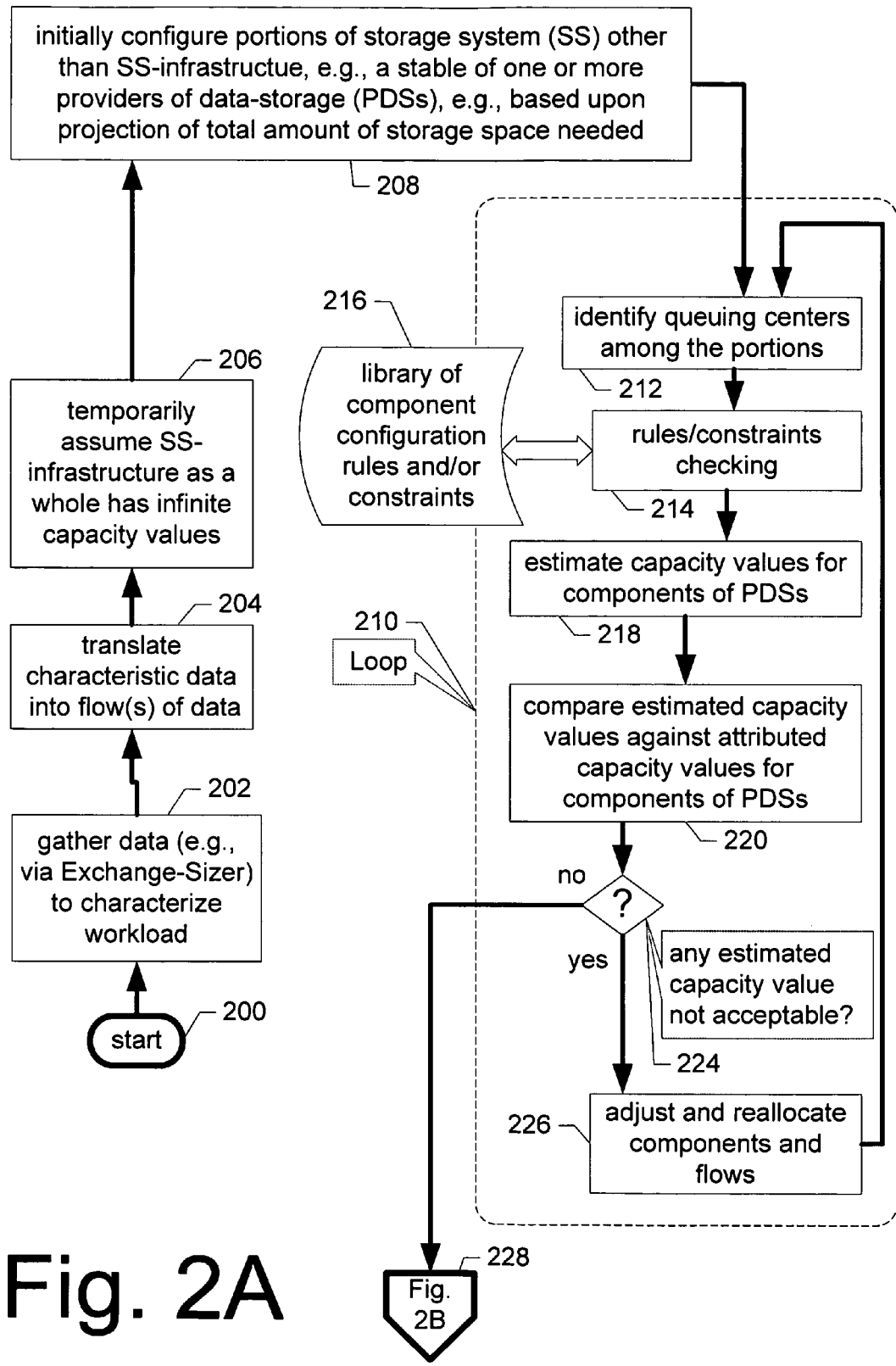
FIG. 2A is a flowchart depicting a method of selecting a set of non-SS-infrastructure portions of a storage system, according to at least one embodiment of the present invention. Included within that method is a method of determining sufficiency of a given set of non-SS-infrastructure portions of a storage system to accommodate one or more flows of data anticipated as flowing therethrough, according to at least one other embodiment of the present invention.

FIG. 2A is a flowchart depicting a method of selecting a set of (or, in other words, sizing) non-SS-infrastructure portions of SAN 108, e.g., PDSs to be included within a stable thereof, according to at least one embodiment of the present invention. Included within that method is a method of determining sufficiency of a given set of non-SS-infrastructure portions of SAN 108 to accommodate one or more flows of data anticipated as flowing therethrough, according to at least one other embodiment of the present invention. Such methods can be implemented, e.g., in software loaded on host 148, or another suitable host. Such a set can include fewer than all, or all, of the non-SS-infrastructure portions.

In the flowchart of FIG. 2A, progression begins at block 200 and proceeds to block 204, where data to characterize the one or more expected workloads is gathered. The gathering of the data can be accomplished, e.g., as follows: semi-automatically via operation of sizing tool software such as the Background Art sizing tool for the Microsoft® brand, Exchange model of messaging and collaboration server; or based upon someone's expertise and done in a less automated manner via a series of questions posed to an administrator of the software application; etc. Such data can characterize one or more of the following characteristics of the software application: patterns regarding input/output (I/O) requests; transaction rates in terms of I/O requests per unit of time; data rates associated with I/O requests; amounts of data associated with typical I/O requests; typical arrival rates for I/O requests; and data-protection levels associated with I/O requests. One of ordinary skill in the art understands the use of such sizing tools, or instead the appropriate manner of less-automated data gathering, by which estimated workloads of given instances of application software can be characterized, e.g., in terms of the number of servers (here, host, e.g., 102-106) needed and the total amount of total amount of storage space estimated as being required thereby.

Progression proceeds to block 204 from block 202 in FIG. 2A. At block 204, basic flows of data are defined according to the instances of application software that are contemplated as coexisting on hosts 102-106, respectively, within system 100. Where multiple instances of application software and/or multiple servers are needed for any of the instances of application software, the translating can include selecting a total number of servers to accommodate the total number of instances of application software. Progression proceeds to block 206, where temporarily it is assumed that SS-infrastructure 138 acts only as a single unit, and that such a unit has capacity values that are infinite. This assumption will be discarded later; see the discussion of FIG. 2B below.

Progression proceeds to block 208 from block 206 in FIG. 2A. At block 208, portions of SAN 108 other than SS-infrastructure 138 are initially configured. Such an initial configuration can be described as a seed for the iterative refinement of loop 210, which is described in more detail below.

To simplify discussion, it will be assumed that only stable 109 of PDSs will be configured. But it is to be understood that other or additional portions of SAN 108 can be configured, e.g., HBAs 150-154, CDSs, etc.

For example, based upon the total amount of storage space estimated as being required by the one or more instances of application software loaded on hosts 102-106, respectively, and in view of, e.g., a commercially available variety of different instances of PDSs, an initial roster of PDSs can be selected for the initial set. The initial roster can be selected, e.g., such that the combination of PDSs that represents the lowest cost by which the estimated total amount of storage space can be achieved.

Or consider, for example, a circumstance in which SAN 108 includes a direct-connection aspect. More particularly, in such a circumstance, at least one host can have a direct connection to at least one of PDSs 110-116 in stable 109, i.e., a connection whose path does not include SS-infrastructure 138. Depending upon the characteristics of the one or more flows between the directly-connected host and one or more PDSs, it may be beneficial also to configure one or more HBAs for the directly-connected host.

Returning to FIG. 2A, progression proceeds to loop 210 from block 206. More particularly, progression within loop 210 begins at block 212, where queuing centers (among the portions of SAN 108 being considered) are identified. A queuing center can be a queue and the system which runs the queue. Under the simplifying assumption made above, the given set (which, upon the first occasion of entering block 212 corresponds to the initial set) of SAN portions is represented by the initial roster of PDSs such that loop 210 (again, here) operates only upon the given roster of PDSs. Some components included within members (here, PDSs) of the non-SS-infrastructure portions (here, the stable of PDSs) represent negligible queuing centers, while others represent significant (if not substantial) queuing centers.

Where (as is assumed here, again for simplicity of discussion) only the selection of PDSs for stable 109 is being considered, instances of at least one of the following types of components of a PDS (which can be described as sub-components of stable 109) can be identified as queuing centers, respectively, namely: a controller; a disk drive; a bus between the controller and a disk drive, logic in the controller operable to select between a plurality of buses connecting the controller to a disk drive; and RAID-level implementation logic in the controller.

Progression proceeds to block 214 from block 212 in FIG. 2A. At block 214, configuration rules and/or constraints are applied to the given roster of PDSs, which here (again, for simplicity of discussion) represents the given roster of SAN portions. A library 216 of component configuration rules and/or constraints can be accessed at block 214.

Such rules and/or constraints take into consideration, for example: how RAID-levels affect the decomposition of a read or write operation into sub-operations on the underlying disk drives; how disk-controller caching affects reads/writes that include sequential patterns or random patterns; how disk-controller buffering (also referred to as chunking), relative to a threshold size, affects reads or writes involving quantities of data exceeding the threshold size; etc.

Such rules and/or constraints can also take into consideration, for example, the limits on the number of I/O operations or data rate available in a particular PDS architecture (e.g., Hewlett Packard's brand, EVA® 3000 model of virtual RAID storage solution is limited to 10,100 Database I/Os per second), the number of physical disk drives that can be contained in the PDS (e.g., the EVA® 3000 model is limited to 56 drives), the limit on any PDS-specific disk-grouping or group-formation rules (e.g., the EVA® model-family of virtual RAID storage solutions can form a maximum of 16 "Disk Groups", whereas Hewlett Packard's brand, XP model-family of storage arrays can form a maximum of 16,384 LDEVs (logical device groupings)). In other words, for example, yet to be allocated storage space on a disk-drive in a PDS might appear as if it could be allocated until a check of a related disk-grouping rule reveals a disk group limit that precludes actually allocating the yet-unallocated storage space.

Furthermore, such rules and/or constraints can also take into consideration, for example, whether the number of disk drives allotted to a PDS, e.g., a RAID, initially or as part of an adjustment (discussed in more detail below) exceeds the maximum number which can be accommodated by the given PDS.

Progression proceeds to block 218 from block 214 in FIG. 2A. At block 218, one or more capacity values are estimated based upon the one or more flows, e.g., by using mean value analysis as is known in queuing theory.

Flows can be characterized by a variety of figures of merit. Three common figures of merit that can used to characterize flows within a storage system are: data rate; throughput; and transfer size. The one or more capacity values of block 218 can be, e.g., one or more of data rate, throughput, and transfer size. But it is to be understood that the one or more capacity values can further include, or be, other figures of merit.

Data rate describes an amount of data passing through a given reference location per unit of time, e.g., mega-bytes per second (MB/sec). Throughput is another type of rate that describes a number of I/O operations per unit time, e.g., I/O per second (I/O/sec). Transfer size describes an amount of data associated with an IO, e.g., mega-bytes per I/O (MB/IO). Having values for any two of data rate, throughput, and transfer size permits the otherwise missing value for the third to be derived. The mean value analysis includes determining the probability density function of the figures of merit being considered.

More particularly as to block 218, one or more capacity values that will be demanded of the components (and sub-components, if under consideration) corresponding to the queuing centers (identified at block 212) are estimated. A component can be a multi-membership component, meaning that two or more individual flows pass through the component. In such a circumstance, the estimated capacity value for the component can be derived as a combination of individual one or more capacity values for the two or more individual flows. Weightings can be provided for different types of flows such that the combination of one or more individual estimated capacity values can be a weighted combination.

Progression proceeds to block 220 from block 218 in FIG. 2A. At block 220, it is determined whether the one or more estimated capacity values are acceptable in a context of corresponding capacity values attributed to the components (and sub-components, if under consideration), respectively. For example, block 220 can include: obtaining one or more rated capacity values of the PDSs (e.g., such information being available from the manufacturer), respectively; applying de-rating rules to the one or more rated capacity values to obtain the corresponding attributed capacity values, respectively; and comparing the one or more estimated capacity values to the one or more de-rated versions of the manufacturer's rated capacity values (i.e., the one or more attributed capacity values), respectively.

Continuing with the simplifying assumption that the given roster of PDSs represents the given set of SAN portions, block 218 estimates one or more capacity values that will be demanded of the PDSs corresponding to the queuing centers (and of sub-components of the PDSs, if under consideration), respectively, and block 220 determines whether the estimated one or more capacity values are acceptable in a context of corresponding capacity values attributed to the components (and sub-components, if under consideration), respectively.

Progression proceeds to decision block 220 from block 218 in FIG. 2A. At decision block 220, it is determined whether any of the estimated one or more capacity values is not acceptable. If not (i.e., all estimated one or more capacity values are acceptable), then a sufficient roster of PDSs forming stable 109 has been achieved, causing progression to exit loop 210 and proceed to FIG. 2B, as indicated by the off-page symbol having item number 228, which will be discussed below. But if so (i.e., at least one estimated capacity value is not acceptable), then flow proceeds to block 226.

At block 226, the given set of SAN portions (here, again, represented by the given roster of PDSs) is adjusted so that components (and sub-components, if under consideration) and/or flows are reallocated. For example, a disk drive might be added to a RAID or another PDS is added (which could, e.g., diminish an amount of a given flow handled by an otherwise overburdened PDS), etc. The adjustment produces a revised roster of PDSs. Before exiting block 226, the revised roster is treated as the given roster of PDSs. From block 226, progression loops back up to block 212, where block 212 as well as blocks 214-224 are repeated.

Figure 2B:
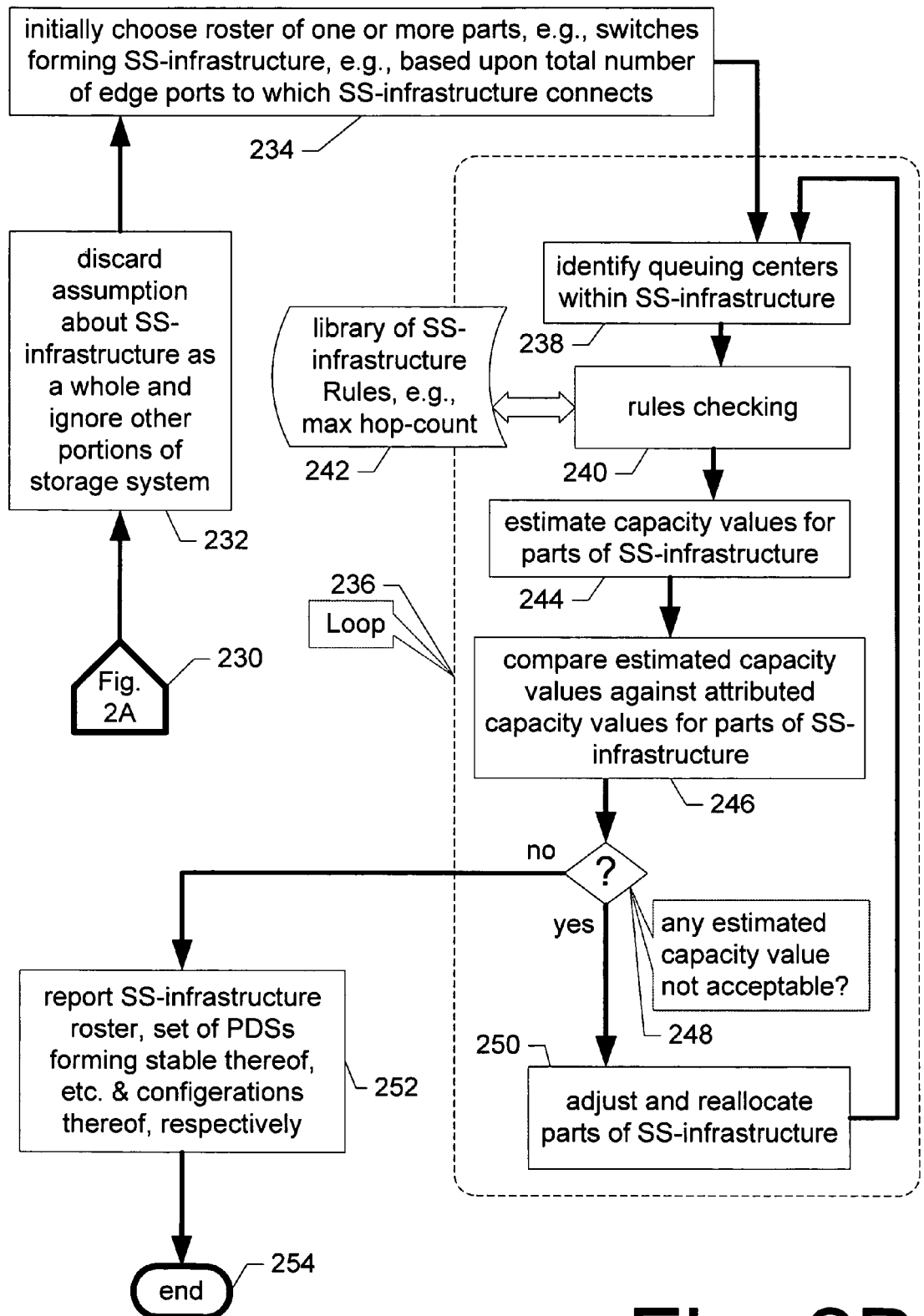
FIG. 2B is a flowchart depicting a method of selecting one or more components of an SS-infrastructure, according to at least one embodiment of the present invention. Included within that method is a method of determining sufficiency of a given set SS-infrastructure components to accommodate one or more flows of data anticipated as flowing therethrough, according to at least one other embodiment of the present invention.

FIG. 2B is a flowchart depicting a method of selecting one or more components of (or, in other words, a method of sizing) SS-infrastructure 138, according to at least one embodiment of the present invention. Included within that method is a method of determining sufficiency of a given set SS-infrastructure components to accommodate one or more flows of data anticipated as flowing therethrough, according to at least one other embodiment of the present invention. Such methods can be implemented, e.g., in software loaded on host 148, or another suitable host.

In the flowchart of FIG. 2B, progression begins at off-page symbol having item number 230, having arrived at this point from FIG. 2A, and then progression proceeds to block 232. At block 232, the temporary assumption as to SS-infrastructure 138 (discussed above, that had treated SS-infrastructure 138 as a single unit having infinite capacity values) is discarded. Also at block 232, the non-SS-infrastructure portions of SAN 108 are temporarily ignored.

Progression proceeds to block 234 from block 232 in FIG. 2B. At block 234, an initial roster of one or more parts, e.g., switches, of SS-infrastructure 138 is initially configured. Such an initial configuration can be described as a seed for the iterative refinement of loop 236, which is described in more detail below.

To simplify discussion, it will be assumed that SS-infrastructure 138 includes only switches. But it is to be understood that other or additional parts can be included in SS-infrastructure 138. For example, based upon a total number of edge ports that the non-SAN fabric portions of SAN 108 represent (as determined by loop 210 of FIG. 2A), and in view of, e.g., a commercially available variety of different instances of switches, an initial roster of switches can be selected for SS-infrastructure 138. The total number of edge ports, in general, can refer to the total number of points of connection to SS-infrastructure 138 required by the hosts (or, e.g., the HBAs therein if present), PDSs, etc. Edge ports are found not only in SS-infrastructures having FC-architectures, but also in SS-infrastructures having other architectures. The initial roster can be selected, e.g., based upon the combination of switches that represents the lowest cost by which the total number of edge ports can be connected and/or by which a desired basic topology for SS-infrastructure 138 can be achieved.

Progression proceeds to loop 236 from block 234 in FIG. 2B. More particularly, progression within loop 236 begins at block 238, where queuing centers among the switches are identified. Loop 236 operates upon a given set of parts that form SS-infrastructure 138 (here, again, for simplicity it is assumed that SS-infrastructure 138 includes only switches). Where block 238 is reached from block 236, the initial roster is treated as the given set.

Progression proceeds to block 240 from block 238 in FIG. 2B. At block 240, configuration rules are applied to the given set of switches. Such rules take into consideration, for example: a maximum hop-count for SS-infrastructure 138; effects of interconnecting switches with multiple cables (ISLs, namely inter-switch links) to form a higher performance paths (also referred to as trunking); the limits on the number of ISLs that can be used with a given switch; the formation of interconnected switches into a bound set of supported/tested configurations (also referred to as "topologies", e.g., ring, mesh, etc) and the performance characteristics of those topologies; etc. A library 242 of SS-infrastructure configuration rules can be accessed at block 240.

Progression proceeds to block 244 from block 240 in FIG. 2B. At block 244, one or more capacity values are estimated based upon the one or more flows. More particularly, one or more capacity values that will be demanded of the switches corresponding to the queuing centers (identified at block 238) are estimated using flow analysis techniques discussed in a co-pending U.S. patent application (namely, U.S. patent application Ser. No. 10/874,128, filed Jun. 22, 2004, U.S. Patent Publication No. 2006/0080463, the entirety of which is hereby incorporated by reference.

As one example, a circumstance can arise in which SAN-infrastructure 138 can include a cross-bar, which is a non-blocking type of switch. Though two flows may pass through the cross-bar, the cross-bar may not represent a point of commonality between the two flows if the two flows do not have at least one port of the cross-bar in common (which can be described as a component of the cross-bar and a sub-component of SS-infrastructure 138). If such a port were common to the two flows, the two flows could be described as merging for at least the hop connected to the common port. For such a common port, its probability density function (PDF) would be a combination of the PDFs for the respective two flows.

As another example, consider a SS-infrastructure 138 through which passes non-storage-system-packet (non-SS-packet) traffic as well as SS-packet traffic. Estimates for capacity values that will be demanded of components that bear non-SS-traffic as well as SS-traffic should reflect a combination of the estimated capacity values that will be demanded by the non-SS-traffic as well as by the SS-traffic.

Then progression proceeds to block 246, where it is determined whether the estimated one or more capacity values are acceptable in a context of corresponding capacity values attributed to the switches, respectively. For example, block 246 (like block 220) can include: obtaining one or more rated capacity values of the switches (e.g., available from the manufacturer), respectively; applying de-rating rules to the one or more rated capacity values to obtain the corresponding attributed capacity values, respectively; and comparing the one or more estimated capacity values to the one or more de-rated versions of the manufacturer's rated capacity values (i.e., the one or more attributed capacity values), respectively.

Progression proceeds to decision block 248 from block 246 in FIG. 2B. At decision block 248, it is determined whether any of the estimated one or more capacity values is not acceptable. If not (i.e., all estimated capacity values are acceptable), then flow exits loop 236 and proceeds to block 252. At block 252, the sufficient SS-infrastructure roster, the sufficient set of PDSs forming stable 109, etc., and configurations thereof, respectively, are reported. From block 252, progression proceeds to block 254 and stops.

But if at least one estimated capacity value is determined to unacceptable at decision block 248, then flow proceeds to block 250. At block 250, the given set of switches is adjusted so that switches are added or deleted, and/or flows are reallocated. The adjustment produces a revised set of switches. Before exiting block 250, the revised set is treated as the given set of switches. From block 250, progression loops back up to block 238, where block 238 as well as blocks 240-248 are repeated.

It is noted that, typically, blocks 204-252 would be performed automatically.

The sizing methods discussed above size the SS-infrastructure portion, and separately one or more among the non-SS-infrastructure portions. In some circumstances, an overall effect can be to have sized all portions of the storage system, i.e., to have sized the entire storage system.

The sequences of steps in the methods discussed above are not limiting, rather they represent example sequences; other sequences of such steps also can carry out the methodologies.

The methodologies discussed above can be embodied as a machine and/or on a machine-readable medium. Such a machine-readable medium can include code segments embodied thereon that, when read by a machine, cause the machine to perform the methodologies described above.

Of course, although several variances and example embodiments of the present invention are discussed herein, it is readily understood by those of ordinary skill in the art that various additional modifications may also be made to the present invention. Accordingly, the example embodiments discussed herein are not limiting of the present invention.

What is claimed:

1. A method for determining sufficiency of a given set of portions included within a storage system (SS) to accommodate one or more flows of data anticipated as flowing therethrough, the method comprising:
    configuring the given set to include at least one of following portions,
        a given stable of one or more providers of data-storage (PDSs), and
        an SS-infrastructure;
    identifying components within members of the given set as queuing centers according to the one or more flows, respectively;
    estimating one or more capacity values, based upon the one or more flows, that will be demanded of the components, respectively; and
    determining whether the estimated one or more capacity values are acceptable in a context of corresponding capacity values attributed to the components, respectively, wherein the determining includes comparing the estimated one or more capacity values to the corresponding one or more capacity values attributed to the components.

2. The method of claim 1, wherein the one or more capacity values include at least one of: data rate; throughput; and transfer size.

3. The method of claim 1, wherein:
    the configuring step results in the given set including the given stable;
    the identifying step identifies components within the one or more PDSs in the given stable as queuing centers according to the one or more flows, respectively;
    the estimating step estimates one or more capacity values that will be demanded of the identified components of the PDSs corresponding to the queuing centers, respectively; and
    the determining step determines whether the estimated one or more capacity values are acceptable in a context of corresponding capacity values attributed to the components of the PDSs, respectively.

4. The method of claim 3, wherein:
    the configuring step further configures the given set to additionally include one or more consumers of data-storage (CDSs),
        the one or more flows flowing between the one or more CDSs and the one or more PDSs in the given stable, respectively;
    the identifying further identifies, according to the one or more flows, components within the one or more CDSs as queuing centers, respectively;
    the estimating further estimates, based upon the one or more flows, one or more capacity values that will be demanded of the identified components of the CDSs corresponding to the queuing centers, respectively; and
    the determining further determines whether the estimated one or more capacity values of the queuing centers are acceptable in a context of corresponding capacity values attributed to the components of the CDSs, respectively.

5. The method of claim 3, wherein:
    the identifying step identifies instances of at least one of the following types of components of a PDS as queuing centers, respectively, namely
        a controller,
        a disk drive,
        a bus between the controller and a disk drive,
        logic in the controller operable to select between a plurality of buses connecting the controller to a disk drive, and
        RAID-level implementation logic in the controller.

6. A method of selecting the one or more PDSs in the given stable recited claim 3, the method comprising:
    performing the method of claim 3 upon the given stable;
    wherein the configuring step includes the following,
        choosing an initial roster of PDSs for the given stable; and
    doing, if one or more of the estimated capacity values for the given stable are determined to be unacceptable, the following,
        revising the given stable to produce a revised stable,
        treating the revised stable as the given stable, and
        performing again the method of claim 3 upon the given stable.

7. The method of claim 6, wherein:
    the choosing step chooses the initial roster based upon a total amount of storage space estimated as being required by the one or more flows.

8. The method of claim 7, wherein:
    the choosing step chooses the initial roster so as to be a lowest cost combination of one or more PDSs that can provide the estimated total amount of storage space.

9. The method of claim 6, wherein the revising step includes at least one of the following:
    changing components included within at least one of the PDSs in the given stable;
    changing configurations of components included within at least one of the PDSs in the given stable; and
    adding another PDS to the given stable; and
    deleting at least one PDS from the given stable.

10. A machine configured to implement the method of claim 6.

11. The method of claim 1, wherein the determining step includes:
    obtaining one or more rated capacity values of the components, respectively;
    applying de-rating rules to the one or more capacity rated values to obtain the corresponding attributed values, respectively.

12. The method of claim 1, wherein
    the configuring step results in the given set representing the SS-infrastructure;
    the identifying step identifies one or more parts of the SS-infrastructure as queuing centers according to the one or more flows, respectively;
    the estimating estimates one or more capacity values that will be demanded of the identified one or more parts of the SS-infrastructure corresponding to the queuing centers, respectively; and
    the determining determines whether the estimated one or more capacity values are acceptable in a context of corresponding capacity values attributed to the identified one or more parts of the SS-infrastructure, respectively.

13. A method of selecting the one or more parts of the SS-infrastructure recited in claim 12, the method comprising:
performing the method of claim 12 upon the given set;
wherein the configuring step includes the following,
choosing an initial roster of one or more parts of the SS-infrastructure to be the given set; and
doing, if one or more of the estimated capacity values for the given set are determined to be unacceptable, the following,
revising the given set to produce a revised set,
treating the revised set as the given set, and
performing again the method of claim 12 upon the given set.

14. The method of claim 13, wherein the choosing step chooses the initial roster based upon at least one of the following:
a total number of edge ports to which the SS-infrastructure connects; and
a desired topology of the SS-infrastructure.

15. The method of claim 14, wherein:
the choosing step chooses and the revising step revises based upon a maximum hop-count for the SS-infrastructure.

16. The method of claim 14, wherein:
the SS-infrastructure includes one or more switches; and
the choosing step chooses the initial roster so as to be a lowest cost combination of the one or more switches that can be arranged to interconnect the edge ports.

17. The method of claim 13, wherein the revising step includes at least one of the following:
changing one or more interconnections amongst the one or more parts of the SS-infrastructure;
adding another one or more parts to the SS-infrastructure; and
deleting one or more parts from the SS-infrastructure.

18. A machine configured to implement the method of claim 13.

19. A machine configured to implement the method of claim 1.

20. A method for determining sufficiency of a given set of portions included within a storage system (SS) to accommodate one or more flows of data anticipated as flowing therethrough, the method comprising:
configuring the given set to include at least one of following portions,
a given stable of one or more providers of data-storage (PDSs), and
an SS-infrastructure;
identifying components within members of the given set as queuing centers according to the one or more flows, respectively;
estimating one or more capacity values, based upon the one or more flows, that will be demanded of the components, respectively; and
determining whether the estimated one or more capacity values are acceptable in a context of corresponding capacity values attributed to the components, respectively,
wherein:
the configuring step results in the given set including the given stable;
the identifying step identifies components within the one or more PDSs in the given stable as queuing centers according to the one or more flows, respectively;
the estimating step estimates one or more capacity values that will be demanded of the identified components of the PDSs corresponding to the queuing centers, respectively; and
the determining step determines whether the estimated one or more capacity values are acceptable in a context of corresponding capacity values attributed to the components of the PDSs, respectively;
regarding, as a first assumption, the SS-infrastructure as a whole to be a single component; and
ignoring the SS-infrastructure as a queuing center in a context in which the components within the one or more PDSs are treated as queuing centers.

21. A method for determining sufficiency of a given set of portions included within a storage system (SS) to accommodate one or more flows of data anticipated as flowing therethrough, the method comprising:
configuring the given set to include at least one of following portions,
a given stable of one or more providers of data-storage (PDSs), and
an SS-infrastructure;
identifying components within members of the given set as queuing centers according to the one or more flows, respectively;
estimating one or more capacity values, based upon the one or more flows, that will be demanded of the components, respectively; and
determining whether the estimated one or more capacity values are acceptable in a context of corresponding capacity values attributed to the components, respectively,
wherein:
the configuring step results in the given set including the given stable; the identifying step identifies components within the one or more PDSs in the given stable as queuing centers according to the one or more flows, respectively;
the estimating step estimates one or more capacity values that will be demanded of the identified components of the PDSs corresponding to the queuing centers, respectively; and
the determining step determines whether the estimated one or more capacity values are acceptable in a context of corresponding capacity values attributed to the components of the PDSs, respectively,
wherein the identifying includes:
assigning the one or more flows to the one or more PDSs, respectively;
determining, for each given one among the one or more flows, which components of the respective PDSs represent significant queuing centers relative to data-storage characteristics of the given flow.

22. A method for determining sufficiency of a given set of portions included within a storage system (SS) to accommodate one or more flows of data anticipated as flowing therethrough, the method comprising:
configuring the given set to include at least one of following portions,
a given stable of one or more providers of data-storage (PDSs), and
an SS-infrastructure;
identifying components within members of the given set as queuing centers according to the one or more flows, respectively;

estimating one or more capacity values, based upon the one or more flows, that will be demanded of the components, respectively; and determining whether the estimated one or more capacity values are acceptable in a context of corresponding capacity values attributed to the components, respectively, at least one of the components is a multi-membership component that is common to two or more flows; and the estimating step includes the following, providing weightings for a plurality of different types of data flows, deriving, for each multi-membership component, an estimated one or more capacity values thereof as a weighted average of individual one or more capacity estimates for the corresponding individual data flows therethrough, respectively.

23. A method for determining sufficiency of a given set of portions included within a storage system (SS) to accommodate one or more flows of data anticipated as flowing therethrough, the method comprising:

configuring the given set to include at least one of following portions, a given stable of one or more providers of data-storage (PDSs), and an SS-infrastructure;

identifying components within members of the given set as queuing centers according to the one or more flows, respectively;

estimating one or more capacity values, based upon the one or more flows, that will be demanded of the components, respectively;

determining whether the estimated one or more capacity values are acceptable in a context of corresponding capacity values attributed to the components, respectively, the configuring step results in the given set representing the SS-infrastructure;

the identifying step identifies one or more parts of the SS-infrastructure as queuing centers according to the one or more flows, respectively;

the estimating estimates one or more capacity values that will be demanded of the identified one or more parts of the SS-infrastructure corresponding to the queuing centers, respectively; and the determining determines whether the estimated one or more capacity values are acceptable in a context of corresponding capacity values attributed to the identified one or more parts of the SS-infrastructure, respectively; and ignoring non-SS-infrastructure portions as queuing centers in a context in which one or more parts of the SS-infrastructure are treated individually as queuing centers.

24. A sufficiency-determining apparatus for determining sufficiency of a given set of portions included within a storage system (SS) to accommodate one or more flows of data anticipated as flowing therethrough, wherein the SS includes providers of data-storage (PDSs) and an SS-infrastructure, the apparatus comprising:

means for configuring the given set to include at least a given stable of one or more of the PDSs, wherein the SS-infrastructure is initially assumed to behave as a single unit;

means for identifying components within members of the given set as queuing centers according to the one or more flows, respectively;

means for estimating one or more capacity values, based upon the one or more flows, that will be demanded of the components, respectively;

means for determining whether the estimated one or more capacity values are acceptable in a context of corresponding capacity values attributed to the components, respectively; and means for selecting one or more components of the SS-infrastructure to accommodate the one or more flows, wherein the means for selecting discards the assumption that the SS-infrastructure is a single unit.

25. The apparatus of claim 24, wherein the one or more capacity values include at least one of: data rate; throughput; and transfer size.

26. A selection apparatus for selecting one or more PDSs in a given stable, the selection apparatus comprising:

the sufficiency-determining apparatus of claim 24, wherein the following is true, operation of the means for configuring upon the given set results in the given set being configured to include the given stable, operation of the means for identifying results in components within the one or more PDSs in the given stable being identified as queuing centers according to the one or more flows, respectively, operation of the means for estimating results in one or more capacity values that will be demanded of the identified components of the PDSs corresponding to the queuing centers, respectively, being estimated, operation of the means for determining results in a determination of whether the estimated one or more capacity values are acceptable in a context of corresponding capacity values attributed to the components of the PDSs, respectively, and the means for configuring also is operable for choosing an initial roster of PDSs for the given stable;

revising means for revising, if one or more of the estimated capacity values for the given stable are determined to be unacceptable, the given stable to produce a revised stable;

treatment means for treating the revised stable as the given stable; and iteration means for controlling the sufficiency-determining apparatus of claim 24 to operate again upon the given stable.

27. A selection apparatus for selecting one or more parts of an SS-infrastructure, the apparatus comprising:

the sufficiency-determining apparatus of claim 24, wherein the following is true, operation of the means for configuring upon the given set results in the given set representing the SS-infrastructure, operation of the means for identifying results in one or more parts of the SS-infrastructure being identified as queuing centers according to the one or more flows, respectively, operation of the means for estimating results in one or more capacity values that will be demanded of the identified one or more parts of the SS-infrastructure corresponding to the queuing centers, respectively, being estimated, operation of the means for determining results in a determination of whether the estimated one or more capacity values are acceptable in a context of corresponding capacity values attributed to the identified one or more parts of the SS-infrastructure, respectively, and the means for configuring also is operable for choosing an initial roster of one or more parts of the SS-infrastructure to be the given set;

revising means for revising, if one or more of the estimated capacity values for the given set are determined to be unacceptable, the given set to produce a revised set;

treatment means for treating the revised set as the given set; and iteration means for controlling the sufficiency-determining apparatus of claim 24 to operate again upon the given set.

28. A machine-readable medium comprising sufficiency-determination instructions, execution of which by a machine determines sufficiency of a given set of portions included within a storage system (SS) to accommodate one or more flows of data anticipated as flowing therethrough, wherein the SS includes providers of data-storage (PDSs) and an SS-infrastructure, the machine-readable instructions comprising:

a configuration code segment to configure the given set to include at least a given stable of one or more of the PDSs, wherein the SS-infrastructure is initially assumed to behave as a single unit;

an identification code segment to identify components within members of the given set as queuing centers according to the one or more flows, respectively;

an estimation code segment to estimate one or more capacity values, based upon the one or more flows, that will be demanded of the components, respectively;

a determination code segment to determine whether the estimated one or more capacity values are acceptable in a context of corresponding capacity values attributed to the components, respectively; and a selection code segment to select one or more components of the SS-infrastructure to accommodate the one or more flows, wherein the selection code segment discards the assumption that the SS-infrastructure is a single unit.

29. The machine-readable instructions of claim 28, wherein the one or more capacity values include at least one of: data rate; throughput; and transfer size.

30. A machine-readable medium comprising instructions, execution of which by a machine selects one or more PDSs in a given stable, the machine-readable instructions comprising:

the sufficiency-determination instructions of claim 28, wherein the following is true, execution of the configuration code segment further renders the machine operable to configure the given set to include the given stable, execution of the identification code segment further renders the machine operable to identify components within the one or more PDSs in the given stable being identified as queuing centers according to the one or more flows, respectively, execution of the estimation code segment further renders the machine operable to estimate one or more capacity values that will be demanded of the identified components of the PDSs corresponding to the queuing centers, respectively, execution of the determination code segment further renders the machine operable to determine whether the estimated one or more capacity values are acceptable in a context of corresponding capacity values attributed to the components of the PDSs, respectively, and execution of the configuration code segment yet further renders the machine operable to choose an initial roster of PDSs for the given stable;

a revising segment to revise, if one or more of the estimated capacity values for the given stable are determined to be unacceptable, the given stable to produce a revised stable;

a treatment code segment to treat the revised stable as the given stable; and an iteration code segment execution of which further renders the machine operable to execute the sufficiency-determination instructions of claim 28 again upon the given stable.

31. A machine-readable medium comprising instructions, execution of which by a machine selects one or more parts of an SS-infrastructure, the machine-readable instructions comprising:

the sufficiency-determination instructions of claim 28, wherein the following is true, execution of the configuration code segment further renders the machine operable to configure the given set as representing the SS-infrastructure, execution of the identification code segment further renders the machine operable to identify one or more parts of the SS-infrastructure as queuing centers according to the one or more flows, respectively, execution of the estimation code segment further renders the machine operable to estimate one or more capacity values that will be demanded of the identified one or more parts of the SS-infrastructure corresponding to the queuing centers, respectively, execution of the determination code segment further renders the machine operable to determine whether the estimated one or more capacity values are acceptable in a context of corresponding capacity values attributed to the one or more parts of the SS-infrastructure, respectively, and execution of the configuration code segment yet further renders the machine operable to choose an initial roster of one or more parts of the SS-infrastructure to be the given set;

a revising segment to revise, if one or more of the estimated capacity values for the given set are determined to be unacceptable, the given set to produce a revised set;

a treatment code segment to treat the revised set as the given set; and an iteration code segment execution of which further renders the machine operable to execute the sufficiency-determination instructions of claim 28 again upon the given set.

* * * * *